Oct. 25, 1932.                E. J. W. RAGSDALE                1,884,222
PORTABLE WELDING APPARATUS
Filed June 16, 1930
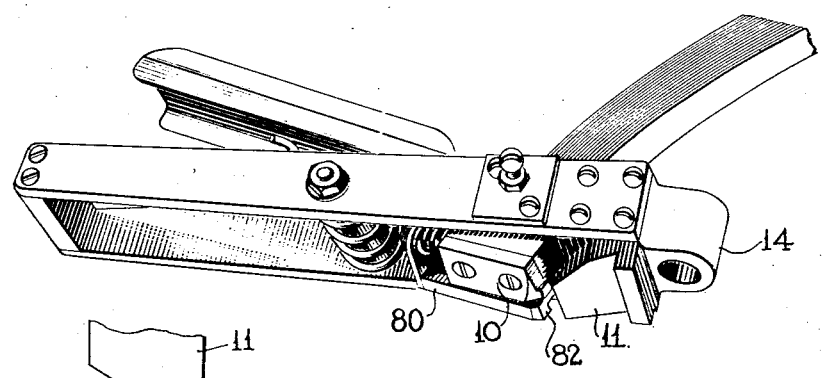
FIG. 1
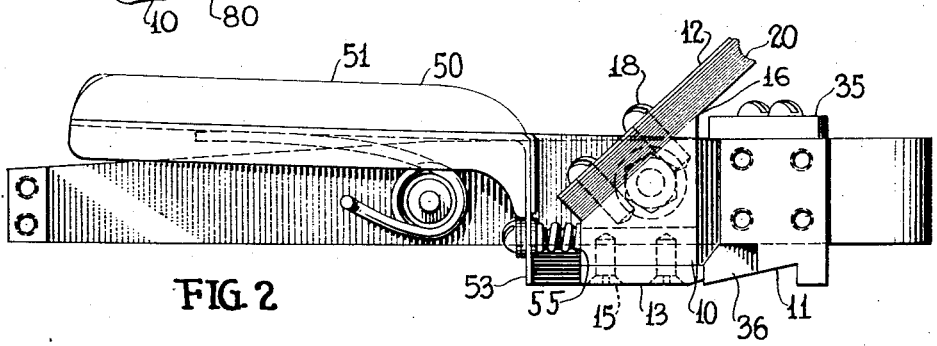
FIG. 4
FIG. 2
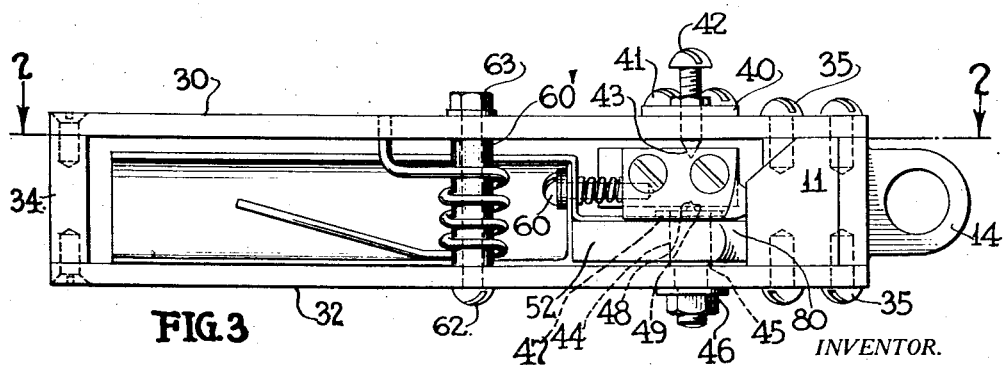
FIG. 3
INVENTOR.
EARL J. W. RAGSDALE.
BY
ATTORNEY.

Patented Oct. 25, 1932

1,884,222

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PORTABLE WELDING APPARATUS

Application filed June 16, 1930. Serial No. 461,476.

This invention relates to electric welding apparatus and in general to a portable welding machine adapted for spot welding the adjacent faces of sheet metal sections to each other. The invention is primarily concerned with an electric resistance welding machine adapted to make a weld either in one spot or to make a weld in a series of separate spots, or in spots overlapping each other so as to form a seam weld according to the positioning of the work to be welded between the electrodes of the welding apparatus. Electric resistance welding machines of this type are commonly known and comprise in general a fixed electrode and a movable electrode in line with and co-acting with the fixed electrode. The two electrodes are suitably connected with a source of welding current and the work is placed between the electrodes and the movable electrode is actuated to approach the work and clamp the same firmly against the fixed electrode so that a circuit is completed between the two electrodes and through the work. In this form of machine the electrodes serve as clamping members and as such, considerable pressure is maintained during the welding operation between the electrodes and the work thereby resulting in undue wear upon the electrodes and sometime in mal-adjustment brought about by this common practice of utilizing them as clamping members.

The principal object of the invention is to provide an electric resistance welding machine in which the pressure necessary for the welding operation is lessened by the provision of a means for clamping the work adjacent the area to be welded independently of the pressure exerted by the opposed electrode, thus reducing the wear upon the electrodes and the mal-adjustment brought about in common practice by utilizing these elements as clamping members.

Another object of the invention is to provide a portable machine which is adapted to do seam welding upon work of irregular or warped formation.

In welding of this nature, it frequently happens that where adjacent faces of two sections of sheet metal are positioned one against the other, preparatory to performing the welding operation, the adjacent faces do not contact with each other throughout the area at which the weld is to take place, with the consequent result that when the current is completed through the two electrodes and through the work, this current does not flow directly through the work from one electrode to the other because of the existence of an air pocket between the adjacent faces of the work. Consequently the current flows around this air pocket from one electrode to the other, causing an imperfect weld. In order to obviate this difficulty in welding, the present invention contemplates the provision of a portable welding apparatus having opposed electrodes adapted to engage the work therebetween and apply a resistance current to the same, provision being made, whereby the work may be firmly compressed to drive out any existing air pockets and to present abutting opposed faces in the work through which current may directly flow from one electrode to the other to form a perfect and sound weld.

An additional object of the invention is to provide a portable welding apparatus in which a constant pre-determined pressure is applied to opposing sides of the work by the electrodes to insure uniformity of successive welds, while at the same time a greater pressure is applied on opposing sides of the work by a means independent of the electrodes for clamping the work together and eliminating or destroying existing air pockets between the work.

A still further object of the invention is to provide a portable electric welding apparatus which is extremely rugged in its construction and which is readily dis-assembled for renewal of the electrodes or replacement of parts. Convenience of arrangement of parts, comparative inexpense of manufacture, and extreme efficiency of operation are further desiderata which have been borne in mind in the production and development of the present invention.

In the accompanying single sheet of drawings, forming a part of this specification and in which drawings similar characters of reference are employed to designate similar parts throughout, one embodiment of the present invention is shown, and in this sheet of drawings, Fig. 1 is a perspective view of the assembled portable welding apparatus.

Fig. 2 is a side elevation of the assembled device, certain parts being removed for the purpose of more clearly illustrating the nature of the invention.

Fig. 3 is a bottom plan view of the assembled device; and

Fig. 4 is a fragmentary view diagrammatically illustrating the manner in which efficient welding is accomplished.

In the form of welding apparatus herein illustrated, and as illustrative of all of such welding machines now in general use, a pair of opposed electrode elements are shown at 10 and 11. These two electrodes are adapted to be suitably connected with a source of welding current which may be, for example, the secondary terminals of a transformer. To this end the lectrode 11 is provided with a socket 14 adapted to receive a terminal of one of the lead-in wires coming from the secondary of the transformer. The work is placed between the two electrodes and by means of an actuating mechanism, the electrodes are caused to approach each other and at an opportune moment the current is applied so that a circuit is completed between the two electrodes and through the work. The resistance of the work to the passage of the electric current quickly raises it to such a temperature that the pieces of sheet material are welded together at the point where pressure is applied by the electrode.

In the present instance the electrode 10 is provided with a flat surface 16 to which is bolted by means of cap screws 18, a lead-in connection 20 formed of laminated strips of copper and adapted to supply current from one terminal of the secondary of the transformer. This electrode is provided with a removable tip in the form of a plate 13 secured by cap screws 15 to the main body of the same, and this tip projects slightly over the edge of the main body of the electrode toward the electrode 11 in order that its projecting portion will contact with the work to pass the current through the same to the other electrode. Electrode 10 is pivoted between a pair of parallel side bars 30 and 32, which side bars are spaced from each other at one end by means of a spacer bar 34 and at the other end by means of the electrode 11, which latter electrode is removably secured in position between the two side bars 30 and 32 by means of cap screws 35. This electrode 11 is provided with a projecting portion 36 considerably wider than, but opposing, the projecting portion on the removable electrode tip 13.

As stated above, the electrode 10 is pivotally mounted between the side bars 30 and 32, and to this end a face plate 40 secured by cap nuts 41, to the side bar 30 has extending therethrough a set screw 42 extending into a recess 43 in one side of the electrode 10. Extending through the side member 32 is a plug member 44 having a shoulder 45 thereon adapted to be clamped against the inner side of the member 32 by means of a nut and washer arrangement 46. This plug member 44 has a second shoulder 47 thereon which is provided centrally with a center point 48 extending into a recess 49 in one side of the electrode 10. Thus it will be seen that the electrode is adjustably centered for tilting movement between the side members 30 and 32.

The electrode 10 is adapted to be tilted so that the projecting portion of the electrode tip 13 will contact with one side of the work and in order to provide a manual means for so tilting the electrode, an operating lever is shown at 50. This lever is provided with a wrist portion 51 which is a counterpart of an extended portion of the side members 30 and 32 and this portion 51, together with such counter-part, forms a handle grip for the operator of the device. The wrist portion 51 of the lever 50 is veneered with wood or the like. The lever 50 is shown as being U-shaped in cross section through the wrist portion 51 and as having a reduced portion 52 also U-shaped in cross section through which the stud 44 extends, and thus the lever is mounted for pivotal movement on the stud 44 between the shoulder 47 on the stud 44 and the side member 32. The forward edge of the wrist portion 51 is provided with a downwardly extending flange 53 and extending through the downwardly extended flange is a threadedly adjustable cap screw 60. This cap screw extends into the electrode element 10 and the electrode element 10 is normally urged away from the forward face of the handle member 51 by means of a coil spring 55 disposed between this element and said forward face until such movement away from the forward face is limited by the head of the cap screw 60. The wrist member 51 is normally urged upwardly from the members 30 and 32 by means of a coil spring disposed about a spacing collar 60' extending between the side members 30 and 32 and held in position by means of a bolt 62 extending through the collar and secured in position by means of a nut 63.

From the arrangement of parts thus far described it will be seen that as the wrist portion 51 is depressed, the electrode 10 is first urged against the work to exert on the same a pressure equal only to the tension of the coil spring 55, regardless of the pressure placed upon the wrist member 51. In order to compress the work to provide for efficient welding, a pressure member 80 is disposed between the parallel sides of the U-shaped reduced portion 52 of the lever 50. This member is best disclosed in Fig. 1 and is in the form of a comparatively narrow block having a flat front portion 82 adapted to bear against the work on the electrode 11 when the wrist member 51 is depressed to advance the depending flange 53 toward the work. The downward movement of the wrist member 51 is limited by the member 80 for when the surface 82 on the member 80 contacts with the work, the pressure on the wrist member 51 is imparted to the work in a degree commensurate with the law of leverages. The force of compression maintained by the coil spring 55 upon the electrode, and consequently the pressure of this electrode upon the work, will be constant regardless of the pressure applied to the wrist member 51. The member 80 being positioned adjacent the electrode 10 and being opposed to the electrode 11, will compress the work to a degree limited only by the strength of the operator, and thus the work will be securely clamped for the welding operation, while the electrode member 10 will press against the work with a pressure predetermined by the judgment of the operator and consequently effective welding will take place. The actual welding operation itself may be performed by closing a switch momentarily to permit current to flow from the one terminal of the secondary of the transformer to the other terminal through the work. It is not deemed advisable to apply the voltages constantly to the electrodes.

The electrodes are properly insulated from each other. This insulating of the electrodes is effected by forming the side members 30, and preferably the compression member 80 of some suitable insulating material having a degree of strength and toughness sufficient to withstand the usages required of it. While these elements may be formed of any suitable material and in any suitable manner, they are preferably formed of some composition such as bakelite or fibre on account of the durability and ruggedness of these elements. However, irrespective of these details, in manufacture, the essential features of the invention are always preserved.

In actual use the fixed electrode 11 and removable electrode 10, together with the underneath side of the side bars adjacent these electrodes form a guide for the work and the operator, by sliding the portable apparatus along the periphery of the work is enabled to perform the welding operation at points equally spaced from the edge of the work. The device is of such size that the operator may perform the welding operation with one hand, if desired.

I do not desire to limit myself to the exact arrangement of parts shown in the accompanying sheets of drawings or described in the specification. Only in so far as the invention is pointed out in the accompanying claims is the same to be limited.

What I claim is:

1. In a portable apparatus for welding sheet material together, a stationary electrode and a movable electrode normally spaced from said stationary electrode, a lever resiliently engaging said movable electrode and adapted upon depression to urge the same against a sheet of material disposed between said electrodes, and a clamping member rigidly secured to said lever and adapted upon depression of said lever to compress the sheet material adjacent the area of engagement of the sheet material between said electrodes.

2. A portable apparatus for welding sheet material together comprising a stationary electrode, a movable electrode normally spaced from said stationary electrode, a clamping member normally spaced from said stationary electrode, said movable electrode and clamping member being adapted to simultaneously engage a sheet of material disposed in contact with said stationary electrode, means for resiliently urging said movable electrode against said sheet material to form an electrical contact therewith, and for positively urging said clamping member against said sheet material to compress the same.

3. In a portable apparatus for welding sheet material together, a stationary electrode and a movable electrode, a clamping member, said movable electrode and clamping member normally occupying a position spaced from said stationary electrode to permit insertion of a sheet of material to be welded between said stationary electrode and said movable electrode and clamping member, means for resiliently urging said movable electrode toward said stationary electrode to establish contact with the sheet of material disposed therebetween, and for urging said clamping member toward said stationary electrode for clamping the sheet of material therebetween.

4. In a portable apparatus for welding sheet material together, a stationary electrode and a movable electrode, a clamping member, said movable electrode and clamping member normally occupying a position spaced from said stationary electrode to permit insertion of a sheet of material to be welded between said stationary electrode and said movable electrode and clamping member, a plate secured to said clamping member, a spring disposed between said plate and movable electrode, whereby movement of said plate normally urging said clamping member toward said stationary electrode will cause yielding pressure of the movable electrode upon the sheet of material disposed between the same and said stationary electrode.

5. An apparatus for welding sheet material together comprising, in combination, a pair of electrodes, means for yieldingly urging one of said electrodes against a sheet of material disposed between said electrodes, and means independent of said electrodes for clamping the sheet of material directly against the other electrode.

6. In a welding machine, the combination with a stationary electrode of a movable electrode, means for causing said movable electrode to engage the sheet material and clamp the same against said stationary electrode for passing electric current therethrough, and additional means adjacent said movable electrode for clamping the sheet material against said stationary electrode to compress the same directly therebetween.

7. In a welding machine, the combination with a stationary electrode of a movable electrode adapted to coact with said stationary electrode to engage the material to be welded therebetween, of means for causing said movable electrode to engage the sheet material and apply a pressure thereto not in excess of the pressure required to establish an electrical contact with the material, and means independent of said movable electrode for clamping the sheet material adjacent said electrode directly against said stationary electrode.

8. In a welding machine, a stationary electrode having a pair of parallel side bars attached thereto, a movable electrode pivoted between said side bars, said movable electrode having a contact surface thereon adapted upon pivotal movement of the movable electrode to engage a sheet of material and clamp the same against said stationary electrode to pass a welding current therethrough, a plate adjacent said movable electrode, means normally maintaining said movable electrode out of contact with the material to be welded, resilient means disposed between said plate and said movable electrode adapted upon movement of said plate toward said movable electrode to engage the work with a pre-determined degree of pressure, and means independent of said last-mentioned means for clamping the sheet of material adjacent said movable electrode.

9. In a welding machine, a stationary electrode having a pair of parallel side bars attached thereto, a movable electrode pivoted between said side bars, said movable electrode having a contact surface thereon adapted upon pivoted movement of the movable electrode to engage a sheet of material and clamp the same against said stationary electrode to pass a welding current therethrough, a plate adjacent said movable electrode, means normally maintaining said movable electrode out of contact with the material to be welded, resilient means disposed between said plate and said movable electrode adapted upon movement of said plate toward said movable electrode to engage the work with a pre-determined degree of pressure, and a pressure member secured to said plate and adapted upon movement of said plate toward said movable electrode to engage the material to compress the same adjacent said movable electrode.

10. A welding machine comprising a stationary contact electrode, a movable contact electrode of relatively smaller contact area than said stationary electrode and arranged to be moved against a plurality of overlapping sheets disposed between said electrodes, a clamping member adjacent the movable electrode directly opposite a portion of the relatively large opposed area of the stationary electrode and arranged to be moved against said sheets to clamp the same directly against said opposed portion of the stationary electrode.

In testimony whereof I hereunto affix my signature.

EARL J. W. RAGSDALE.